Dec. 4, 1951  G. C. ENGSTRAND  2,576,928
FLOATING DRY DOCK
Filed Nov. 26, 1949
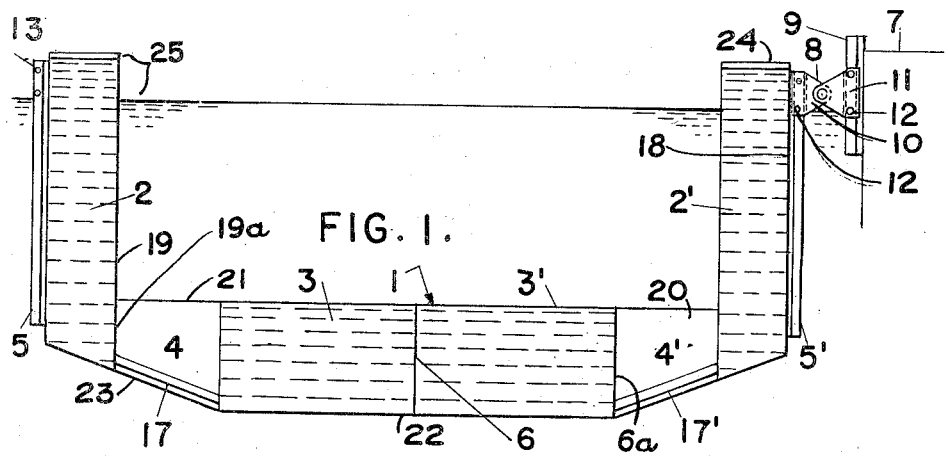
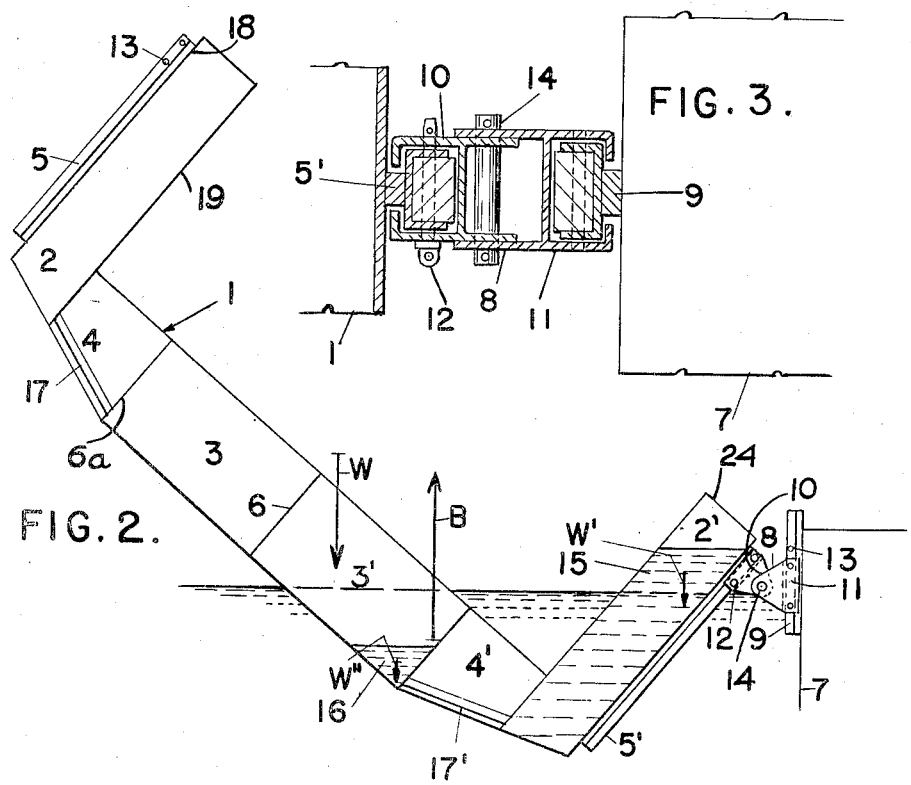
WITNESSES.
INVENTOR.
Gunnar C. Engstrand Patented Dec. 4, 1951

2,576,928

UNITED STATES PATENT OFFICE 2,576,928

FLOATING DRY DOCK

Gunnar C. Engstrand, New York, N. Y., assignor, by mesne assignments, to Frederic R. Harris, Inc., New York, N. Y., a corporation of New York Application November 26, 1949, Serial No. 129,680

2 Claims. (Cl. 114—45)

My invention relates to an improvement in floating drydocks, and it has for its object to provide a floating drydock of extreme economy in structure as well as in upkeep. While floating dock investigations, discussions and design for many years have centered on the construction of a dock suitable for self-docking without sacrificing the advantages of the one-piece trough dock, that is a dock which does not have separable sections that can be detached for repair and cleaning such efforts have failed to produce a one-piece trough dock of conventional dimensions that is innately self-docking. To this end, my invention relates to a floating dry dock that is formed as a single trough or one-piece dock and is provided with internal means as well as external special mooring arrangements that permit the entire bottom to be exposed by careening the docks, so that scraping and painting thereof as well as bottom repairs may be undertaken at suitable times without any special and costly preparations, and frequent bottom inspections can be made routine, so that bottom pitting and rusting will get no chance to develop.

In the drawing, Figure 1 represents my preferred structure in its pier moorings and submerged to maximum draft. Figure 2 shows the structure in self-docking position in its pier moorings. Figure 3 is a detail drawing of the mooring devices on an enlarged scale. In the drawing where like characters denote corresponding parts, I represents my preferred dock which comprises a pontoon hull and hollow side or "wing" walls that extend along the hull and enclose the side chambers 2 and 2', which are adapted to contain water, a pontoon hull and hollow side or "wing" walls that extend along the hull and enclose the adjacent buoyancy chambers 4 and 4', that are adapted to carry the dock's own weight, and the central pumping compartments 3 and 3', all of which are arranged symmetrically around the center bulkhead 6. Pipes 17 and 17' provide communication between the side chambers 2 and 2' and the central pontoon chambers.

The combination of the central bulkhead 6 which separates the compartments or chambers 3 and 3' from each other, and the buoyancy chambers located at a distance from bulkhead 6 and also located at a distance from the sides of the pontoon hull, enables the operation of the dock to be so controlled that the effects of the upsetting movements of the free water inside the hull when the dock is raised are virtually eliminated. Therefore the maximum water pressure to which the structure is subjected is greatly reduced. This fact allows a great saving in the width of the drydock and the weight. The wings in particular can be narrow in thickness; and with the dock having smaller width and reduced weight much steel or other material used in the construction of the dock can be saved.

The sides of the dock are provided with identical mooring spuds 5 and 5', which are so arranged that the dock may be swung around for the self-docking of the opposite side. The pier 7 is shown provided with relatively short mooring spuds 9 to allow for tidal as well as operative level variations. A double mooring jaw 8 comprises the jaw 10, which is adapted to slide on a dock spud 5' and this jaw is hinged to the jaw 11, which, in turn, is adapted to slide on a spud 9 attached to a pier or other fixed support. When the dock is used for regular ship service, the jaw 11 is locked to the pier spud 9 by a pair of locking pins 12, which are adapted for insertion into the holes 13, with which the spuds are provided, and the pivot pin 14 allows the free listing of the dock in regular ship service as well as in self-docking operations. Of course there will be several spuds 5 and 5' at different points along the length of the sides of the dock and several spuds 9 on the pier 7, and each spud on the side of the dock will be connected to an adjacent spud on the pier by a separate mooring jaw 8.

I prefer to make the buoyant chambers 4—4' larger than the requirements for the support of the dock weight, and I, therefore, have to pump water into the side chambers when the empty dock is being submerged. The maximum draft is reached when the freeboard space at the top of the side chambers is filled with water. The shown arrangement results in a very stable dock structure at the critical point, when the ship just emerges from the water and the balancing is performed solely by the side chambers. The only free water surfaces inside the dock at this moment are defined by the innermost bulkheads 6a of the buoyancy chambers, and the center bulkhead, and relatively narrow wings will suffice, which means a narrower dock structure with a corresponding saving in material. Spaces 4—4' contain the pump gear.

In general shape the dock resembles a large trough with bottom upright sides and two opposite open ends. The wing or side walls enclosing the chambers 2 and 2' include outer or outboard walls 18 and inner or inboard walls 19 rising above the level of the deck 20 of the pontoon hull indicated at 21 between them. Both walls 18 and 19 extend down to the bottom of the dock and the lower parts 19a of the inboard walls 19 constitute watertight bulkheads separating the chambers 2 and 2' from the buoyancy chambers 4 and 4' respectively. The bottom part 22 of the dock is horizontal and parallel to the deck 20, and the flood chambers 3 and 3' are thus contained between the ends of the pontoon hull, the deck 20 and the middle part 22 of the bottom; the long central bulkhead 6 dividing the chambers 3 and 3' from each other. Under the chambers 2 and 4, and 2' and 4', the bottom slopes upward from each side of the mid part of section 22, as indicated at 23. The side walls are of course closed at the tops 24, over the chambers 2 and 2' and at the ends, and when the dock is at maximum draft or fully submerged, the freeboard parts of the side walls which remain above the water level are indicated at 25. The bottom can be parallel to the deck 20 over its full width if desired.

In Figure 2, I have shown diagrammatically the load conditions at self-docking with the dock tilted in its moorings for bottom repair. The jaw 11 is locked to the pier stud 9 by means of the pins 12; and that the dock is free to move up and down with tidal variations. In regular service the jaws 10 can slide on the spuds or rails 5' while the mooring devices are locked to the spuds 9. When the dock is in a tilted position the jaws 10 are preferably locked to the spuds or rails 5' by pins 12 to prevent movement of the dock; the tops of the spuds 5' having holes into which the pins are inserted. The dock weight is represented by the force W and W' and W'' are the respective weights of the excess water masses inside the side chamber 2' and the pontoon chamber 3'. The three weights are supported by the buoyancy force of chamber 4' together with that part of chamber 3' that lies between the outside water line and the buoyancy chamber, which force is denoted by B in the drawing.

The existance of the excess water 16 in chamber 3' and a vacant space at the top of the side chamber 2' indicates that the dock may be tilted still more than shown in the drawing, which is a true scale drawing of my preferred floating dry dock.

A dock of this design can easily be tilted so that more than half of its bottom is exposed regardless of the cross-sectional shape of the hull. I might make the hull rectangular in cross-section and tilt it with the same ease and certainty.

It is apparent that I have provided a dock that constitutes an improvement on the prior art, and I wish to be understood to claim such modifications that properly fall within the scope of my invention and the terms of the following claims:

1. A floating drydock structure comprising a pontoon hull, said hull having a centrally longitudinally-extending bulkhead, a longitudinally-extending bulkhead disposed on each side of said first bulkhead and spaced from the sides of the hull, said bulkheads forming a pair of watertight flooding chambers adjacent said central bulkhead, wing chambers adjacent each side of said pontoon hull, each of said wing chambers including spaced inner and outer side walls extending from the bottom of the pontoon hull and above the top thereof, the inner walls of said wing chambers cooperating with said longitudinal bulkheads to form buoyancy chambers of such size so as to support the drydock when said wing chambers and said flooding chambers are filled with water and means attached to one of said outer side walls and adapted to cooperate with a support for holding said drydock in tilted position relative to the support, said wing chambers and said flooding chambers being so proportioned that when one wing chamber and both flooding chambers are substantially empty and the other of said wing chambers is substantially filled with water, there is produced an asymmetrical loading within the said structure, which by reason of the displacement of the buoyancy of the structure effects a tilting thereof about said means to thereby expose more than one half of the bottom of the pontoon hull above the surface of the water of floatation.

2. The floating drydock structure as defined in claim 1, wherein said means comprises a jaw adapted to be secured to the support, and a jaw slidably connected to said wing wall and pivotally united to the first named jaw.

GUNNAR C. ENGSTRAND.

REFERENCES CITED

The following references are of record in the file of this patent:

UNITED STATES PATENTS

| Number | Name | Date |
|---|---|---|
| 601,554 | Clark | Mar. 29, 1898 |
| 755,854 | Dieckhoff | Mar. 29, 1904 |
| 853,328 | Wiking | May 14, 1907 |
| 1,267,956 | Baeck | May 28, 1918 |
| 1,671,037 | McClure | May 22, 1928 |

FOREIGN PATENTS

| Number | Country | Date |
|---|---|---|
| 38,644 | Austria | Aug. 25, 1909 |
| 343,634 | France | Aug. 11, 1904 |